US012650373B2

(12) United States Patent
Kim et al.

(10) Patent No.: US 12,650,373 B2
(45) Date of Patent: Jun. 9, 2026

(54) PARTICLE MEASURING APPARATUS AND MANUFACTURING METHOD THEREOF

(71) Applicant: Daegu Gyeongbuk Institute of Science and Technology, Daegu (KR)

(72) Inventors: Hoe Joon Kim, Seoul (KR); Il Ryu Jang, Daegu (KR)

(73) Assignee: Daegu Gyeongbuk Institute of Science and Technology, Daegu (KR)

( * ) Notice: Subject to any disclaimer, the term of this patent is extended or adjusted under 35 U.S.C. 154(b) by 270 days.

(21) Appl. No.: 18/279,542

(22) PCT Filed: May 2, 2022

(86) PCT No.: PCT/KR2022/006221
§ 371 (c)(1),
(2) Date: Aug. 30, 2023

(87) PCT Pub. No.: WO2022/265220
PCT Pub. Date: Dec. 22, 2022

(65) Prior Publication Data
US 2024/0151629 A1 May 9, 2024

(30) Foreign Application Priority Data

Jun. 16, 2021 (KR) ........................ 10-2021-0078266

(51) Int. Cl.
G01N 15/12 (2024.01)
G01N 15/10 (2024.01)
(52) U.S. Cl.
CPC ... G01N 15/132 (2024.01); G01N 2015/1021 (2024.01); G01N 2015/135 (2024.01)

(58) Field of Classification Search
None
See application file for complete search history.

(56) References Cited

U.S. PATENT DOCUMENTS 10,107,827 B1 * 10/2018 Agarwal ................... G01L 1/18

FOREIGN PATENT DOCUMENTS

CN        104198321 B  *  1/2017
JP          5205822 B2      6/2013
(Continued)

OTHER PUBLICATIONS

Jang, I.R. et al. "Quartz Crystal Microbalance with Thermally-Controlled Surface Adhesion for an Efficient Fine Dust Collection and Sensing", Jo.*

(Continued)

*Primary Examiner* — Daniel S Larkin
(74) *Attorney, Agent, or Firm* — Sughrue Mion, PLLC

(57) ABSTRACT

Disclosed is a particle-measuring device, including: a measurement part including first and second electrodes and measuring a mass of particles with a change in signals transmitted and received between the first and second electrodes, wherein the first and second electrodes are patterned on a base made of a piezoelectric material and transmit/receive signals to/from each other; and an adsorption part provided in an adsorption region between the first and second electrodes and configured to adsorb fine particles according to a temperature change. According to such a configuration, the particle-measuring device does not interfere with the resonance rate of a piezoelectric material while having a high adsorption rate, thereby providing excellent particle measurement quality.

12 Claims, 5 Drawing Sheets

1

(56)  References Cited

FOREIGN PATENT DOCUMENTS

| JP | 5416938 B2 | 2/2014 | |
| JP | 2015-66510 A | 4/2015 | |
| JP | 2016-65726 A | 4/2016 | |
| KR | 10-2005-0095964 A | 10/2005 | |
| KR | 10-2016-0139731 A | 12/2016 | |
| KR | 10-1834088 B1 | 3/2018 | |
| KR | 101834088 B | * 3/2018 | ............. G01W 1/02 |

OTHER PUBLICATIONS

White, C. et al., "Development of a Plasticizer-Poly(Methyl Methacrylate) Membrane for Sensing Petroleum Hydrocarbons in Water", Sensors and Actuators B: Chemical, vol. 193, 2014, pp. 70-77.*

Bailey, C.M. et al., "Size Dependence of Gold Nanoparticle Interactions with a Supported Llipid Bilayer: A QCM-D study" Biophysical Chemistry, vol. 203-204, 2015, pp. 51-61.*

Zhao, J. et al., "Airborne Particulate Matter Classification and Concentration Detection Based on 3D Printed Virtual Impactor and Quartz Crystal Microbalance Sensor", MEMS 2016, Shanghai, China, Jan. 24-28, 2016, pp. 824-827.*

U Ryu Jang et al., "Healer Integrated Quartz Crystal Microbalance Sensor for Atmospheric Fine Particle Mass.", 2020 Conference of Korean Association for Particle and Aerosol Research, Oct. 28, 2020, 156 pgs.

International Search Report for PCT/KR2022/006221 dated, Aug. 9, 2022 (PCT/ISA/210).

* cited by examiner

<u>1'</u>

PARTICLE MEASURING APPARATUS AND MANUFACTURING METHOD THEREOF

CROSS REFERENCE TO RELATED APPLICATIONS

This application is a National Stage of International Application No. PCT/KR2022/006221 filed May 2, 2021, claiming priority based on Korean Patent Application No. 10-2021-0078266 filed on 16 Jun. 2021.

TECHNICAL FIELD

The present invention relates to a particle-measuring device and a method of manufacturing the same, and more particularly to a particle-measuring device capable of improving the mass measurement efficiency by increasing the adsorption rate of fine particles and a method of manufacturing the particle-measuring device.

BACKGROUND ART

A general piezoelectric material is applied with an alternating current signal through a measurement part patterned according to vibration characteristics. The applied alternating current signal induces vibration by exciting a piezoelectric material with a specific vibration mode and frequency. A piezoelectric sensor measures the weight of physically deposited fine particles as an electrical signal using the characteristics of a piezoelectric material. Such a piezoelectric sensor is used in various fields, such as metal thin film thickness measurement, biological properties, and chemical reaction analysis, based on its very high resolution and sensitivity.

Meanwhile, in the case of mass measurement of fine particles, quite unstable driving characteristics are exhibited due to factors, such as particle size, adsorption position and low adsorption force, unlike the application field of a piezoelectric sensor. Accordingly, such a piezoelectric sensor has limitations in applying to a piezoelectric sensor-based field due to a limitation in sensing particles. Thus, various studies into improving the measurement quality of fine particles using a piezoelectric sensor have been continuously required in recent years.

DISCLOSURE

Technical Problem

Therefore, the present invention has been made in view of the above problems, and it is one object of the present invention to provide a particle-measuring device with excellent particle measurement quality capable of improving the adsorption rate of particles without reducing the resonance rate of a piezoelectric material.

It is another object of the present invention to provide a method of manufacturing a particle-measuring device capable of achieving the object.

Technical Solution

In accordance with an aspect of the present invention, the above and other objects can be accomplished by the provision of a particle-measuring device, including: a measurement part including first and second electrodes and measuring a mass of particles with a change in signals transmitted and received between the first and second electrodes, wherein the first and second electrodes are patterned on a base made of a piezoelectric material and transmit/receive signals to/from each other; and an adsorption part provided in an adsorption region between the first and second electrodes and configured to adsorb fine particles according to a temperature change.

In addition, the measurement part may include: the first and second electrodes patterned to be spaced apart from each other with respect to the base to face each other; and a control circuit configured to control transmission and reception of the signals to the first and second electrodes and measure mass of particles by mutually comparing the signals transmitted and received to the first and second electrodes, wherein, when an alternating current signal is applied to at least one of the first and second electrodes, the applied alternating current signal is excited to another one of the first and second electrodes to generate vibration of the piezoelectric material.

In addition, the adsorption part may include: a heat-generating member patterned in the adsorption region between the first and second electrodes; and an adsorption member deposited to cover the heat-generating member, wherein in a particle capturing mode for capturing the particles, heating of the heat-generating member is turned on to soften the adsorption member and capture the particles, and in a particle measurement mode for measuring the particles, heating of the heat-generating member is turned off to harden the adsorption member.

In addition, the adsorption member may be made of a thermoplastic polymer material and coated on a surface of the base in a thin film form to cover the heat-generating member.

In addition, the heat-generating member may be made of a metal material including platinum, and the adsorption member may be made of a thermoplastic polymer plastic material including poly(methyl methacrylate) (PMMA).

In addition, the base may resonate along a thickness or surface and have a circular or square shape.

In addition, an adsorption electrode may be provided between the first and second electrodes to be electrically connected to the first and second electrodes to correspond to the adsorption region.

In accordance with another aspect of the present invention, there is provided a method of manufacturing a particle-measuring device, the method including: a first step of patterning first and second electrodes to be spaced apart from each other on abase made of a piezoelectric material; a second step of patterning a heat-generating member, capable of generating heat, between the first and second electrodes; and a third step of depositing an adsorption member on a surface of the heat-generating member, wherein when the heat-generating member is turned on, particles are captured in the adsorption member, and, when the heat-generating member is turned off, the piezoelectric material resonated to measure the particles.

In addition, the adsorption member may be made of a thermoplastic polymer material and coated on a surface of the base in a thin film form to cover the heat-generating member.

In addition, the heat-generating member may be made of a metal material including platinum, and the adsorption member may be made of a thermoplastic polymer plastic material including poly(methyl methacrylate) (PMMA).

In addition, the base may resonate along a thickness or surface and have a circular or square shape.

In addition, an adsorption electrode may be provided between the first and second electrodes to be electrically connected to the first and second electrodes to correspond to the adsorption region.

Advantageous Effects

In accordance with the present invention having the above-described configuration, first, a high adsorption rate and resonance rate can be secured due to the inclusion of an adsorption part capable of adjusting adsorption power according to a heating temperature, so that the particle measurement quality can be improved.

Second, an adsorption member made of a thermoplastic polymer material whose surface characteristics can be varied according to temperature can be softened by turning on/off a heat-generating member, thereby securing an adsorption rate, and since the adsorption member is hardened during particle measurement, it does not decrease a resonance rate. Accordingly, a particle-measuring device that is simple to use and economically efficient due to low power consumption can be provided.

Third, a particle-measuring device that is simple to manufacture and small in size can be manufactured by coating an adsorption member in the form of a thin film on the heat-generating member patterned on an adsorption region of a base made of a piezoelectric material.

Fourth, since an adsorption rate for various particles can be secured, the present invention can be applied to particle measurement in various fields.

Fifth, the present invention can realize precise particle measurement quality even in a high-humidity environment due to the heat generation of the heat-generating member and, accordingly, can improve temperature- and humidity-dependent sensor characteristics, thereby capable of implementing a stable particle measurement system that is not affected by external environmental factors.

BEST MODE

Hereinafter, the present invention will be described in detail by explaining a preferred embodiment of the invention with reference to the attached drawings. However, it should be understood that the spirit and scope of the present disclosure are not limited to the embodiment and can be modified by addition, modification, or deletion of elements constituting the embodiment and such additions, modifications, and deletions are also within the spirit and scope of the present disclosure.

Figure 1:
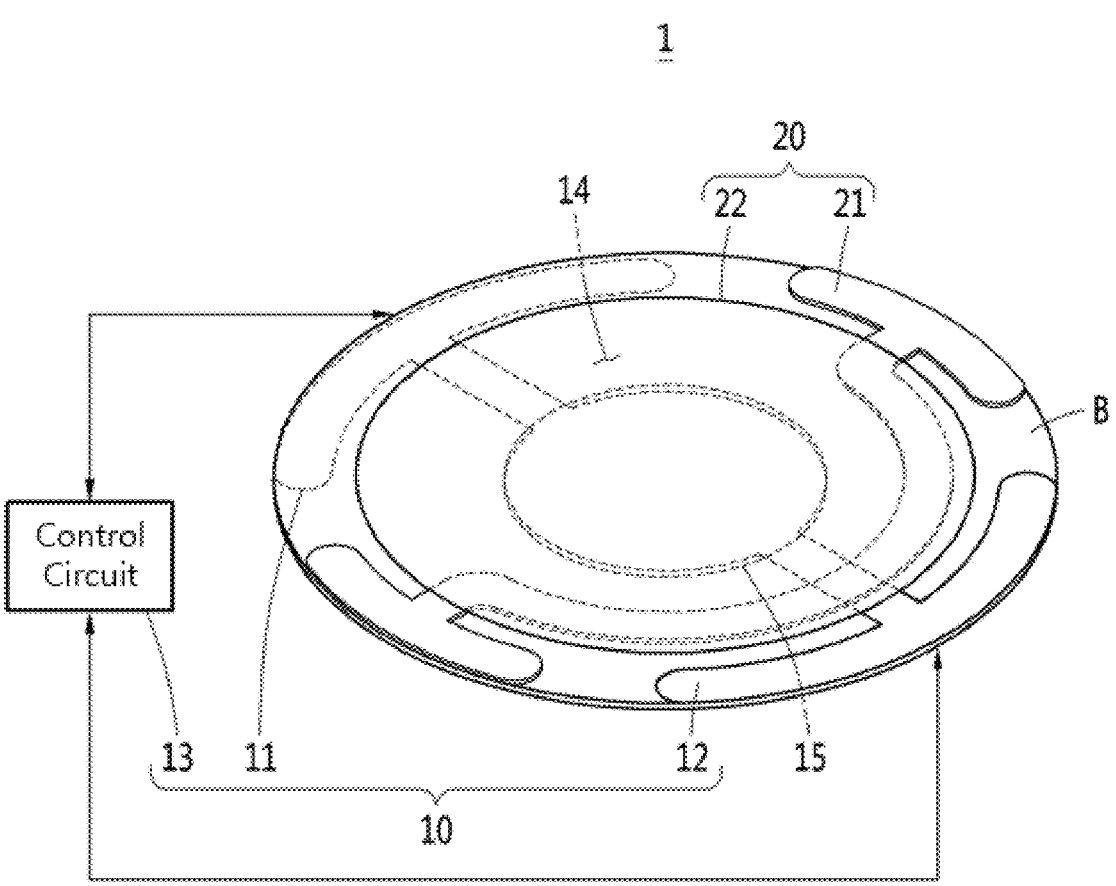
FIG. 1 is a perspective view schematically illustrating a particle-measuring device according to a preferred embodiment of the present invention.

Referring to FIG. 1, a particle-measuring device 1 according to a preferred embodiment of the present invention includes a measurement part 10 and an adsorption part 20.

For reference, the particle-measuring device 1 described in the present invention is exemplified by measuring the mass of fine particles, such as fine dust. However, it is not necessarily limited thereto, and the particle-measuring device 1 according to the present invention may be applied to measure the mass of various types of particles.

The measurement part 10 is provided on a base B made of a piezoelectric material, and measures the mass of particles, such as fine dust, adsorbed on the base B by inducing vibration of the piezoelectric material. For this, the measurement part 10 includes a first electrode 11, a second electrode 12 and a control circuit 13.

The first and second electrodes 11 and 12 are patterned on the base B made of a piezoelectric material to mutually transmit and receive signals. Here, the first and second electrodes 11 and 12 are applied with an alternating current signal by electrical connection with the control circuit 13 to be described below, causing vibration of the piezoelectric material constituting the base B. More specifically, when an alternating current signal is applied to at least one of the first and second electrodes 11 and 12, the applied alternating current signal vibrates the piezoelectric material by exciting it with a specific vibration mode and frequency toward the other one of the first and second electrodes 11 and 12.

For reference, one of the first and second electrodes 11 and 12, for example, the first electrode 11, is patterned in a state of being inserted into the base B by a predetermined depth, and the second electrode 12 is patterned on the surface of the base B to vibrate in a thickness direction of the base B.

The control circuit 13 controls transmission and reception of signals to the first and second electrodes 11 and 12 and compares the signals transmitted to and received by the first and second electrodes 11 and 12, thereby measuring the mass of particles. In summary, the control circuit 13 receives an alternating current signal received by the other one of the first and second electrodes 11 and 12 when an alternating current signal is transmitted to one of the first and second electrodes 11 and 12. Accordingly, the control circuit 13 measures the mass of particles adsorbed to the adsorption part 20 to be described below by mutually comparing changes in transmitted and received signals between the first and second electrodes 11 and 12.

For reference, one embodiment wherein the first and second electrodes 11 and 12 are electrically connected to each other through a mutual electrode line, and an adsorption electrode 15 having a predetermined area is patterned in an adsorption region 14 between the first and second electrodes 11 and 12 is exemplified. That is, the adsorption electrode 15 may be patterned on the base B to correspond to the adsorption region 14, but the shape of the adsorption electrode 15 is not limited thereto.

The adsorption part 20 is provided between the first and second electrodes 11 and 12 and adsorbs and captures particles, such as fine dust. The adsorption part 20 includes a heat-generating member 21 and an adsorption member 22.

The heat-generating member 21 is a heater provided with a kind of electrode line patterned in the adsorption region 14 provided between the first and second electrodes 11 and 12. The heat-generating member 21 is electrically connected to an external power supply means (not shown), and heating thereof is selectively turned on/off. Here, the heat-generating member 21 may be made of platinum (Pt) that is one metal material having low chemical reactivity. However, the material of the heat-generating member 21 is not limited to platinum and may be selected from among various metal materials capable of generating heat through electrical signal connection.

The adsorption member 22 is deposited on the base B to cover the heat-generating member 21. The adsorption member 22 is made of a polymer material and is coated in a thin film form on the surface of the heat-generating member 21. Here, the adsorption member 22 is made of a thermoplastic polymer material and may include a thermoplastic polymer plastic, such as poly(methyl methacrylate) (PMMA).

Meanwhile, the adsorption member 22 coated in the form of a thin film on the heat-generating member 21 is heated and softened by heat generated by the heat-generating member 21, which is advantageous for particle capture. In addition, when the heat generation of the heat-generating member 21 is turned off, the adsorption member 22 is hardened again and does not interfere with the resonance rate of the piezoelectric material.

For reference, the particle-measuring device 1 described in the present invention is provided on the base B with a circular shape and is provided to be mutually spaced apart in a radial direction, without being limited thereto. For example, as shown in FIG. 2, a modification wherein a particle-measuring device 1' is provided on a base B with a substantially square shape, such as a rectangle, is also possible.

Figure 2:
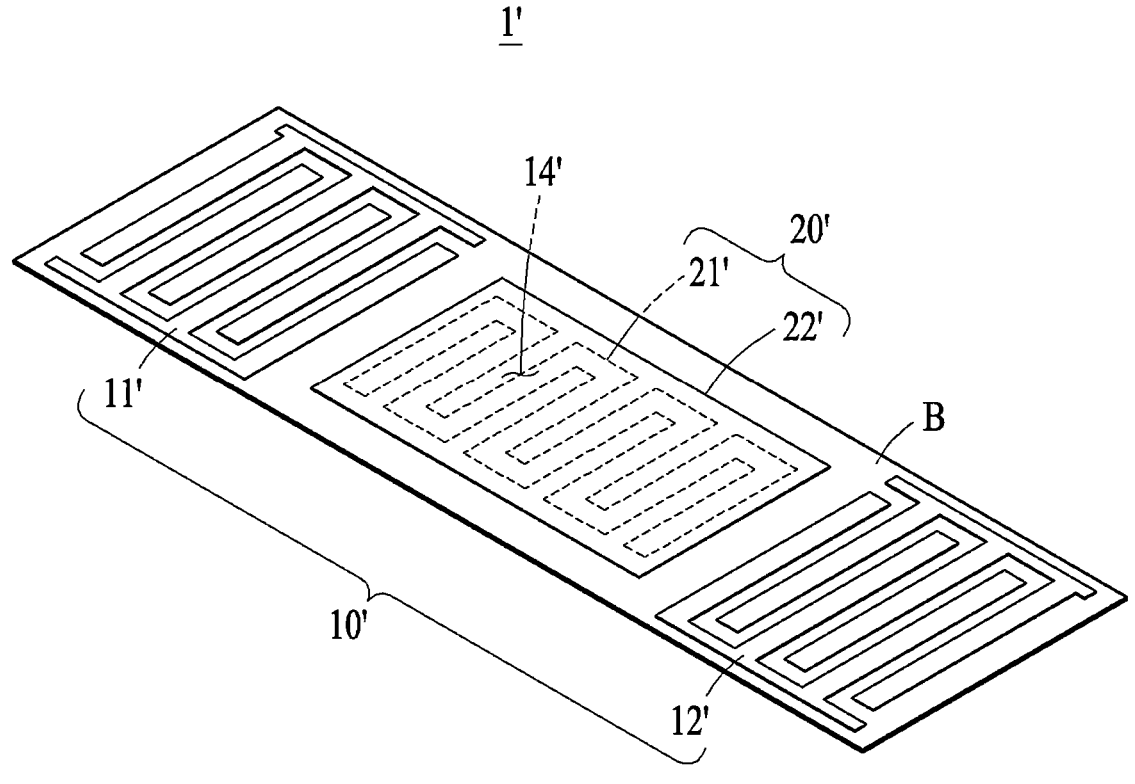
FIG. 2 is a perspective view schematically illustrating a modified embodiment of the particle-measuring device of FIG. 1.

In a particle-measuring device 1' according to a modified embodiment of FIG. 2, first and second electrodes 11' and 12' of a measurement part 10' are provided to be spaced apart from each other in a longitudinal direction on opposite ends of a rectangular base B, and an adsorption part 20' is provided between the first and second electrodes 11' and 12'. Here, the heat-generating member 21' and adsorption member 22' of the adsorption part 20' are provided in an adsorption region 14' provided between the first and second electrodes 11' and 12'. Here, the adsorption region 14' may not be provided with a separate adsorption electrode 15 (see FIG. 1).

In the particle-measuring device 1' shown in FIG. 2, the first and second electrodes 11' and 12' are provided on the surface of the base B. Accordingly, vibrations generated by the transmission and reception of alternating current between the first and second electrodes 11' and 12' are transmitted to the surface of the base B made of a piezoelectric material. In contrast, in the particle-measuring device 1 shown in FIG. 1, vibration is transmitted in a thickness direction between the first and second electrodes 11 and 12. As described above, the shape and size of the base B and the position and shape of the first and second electrodes 11 and 12 (11' and 12') may be variously modified, and the transmission method of vibrations generated through the measurement part 10 (10') is not limited to the illustrated embodiments.

Figure 3:
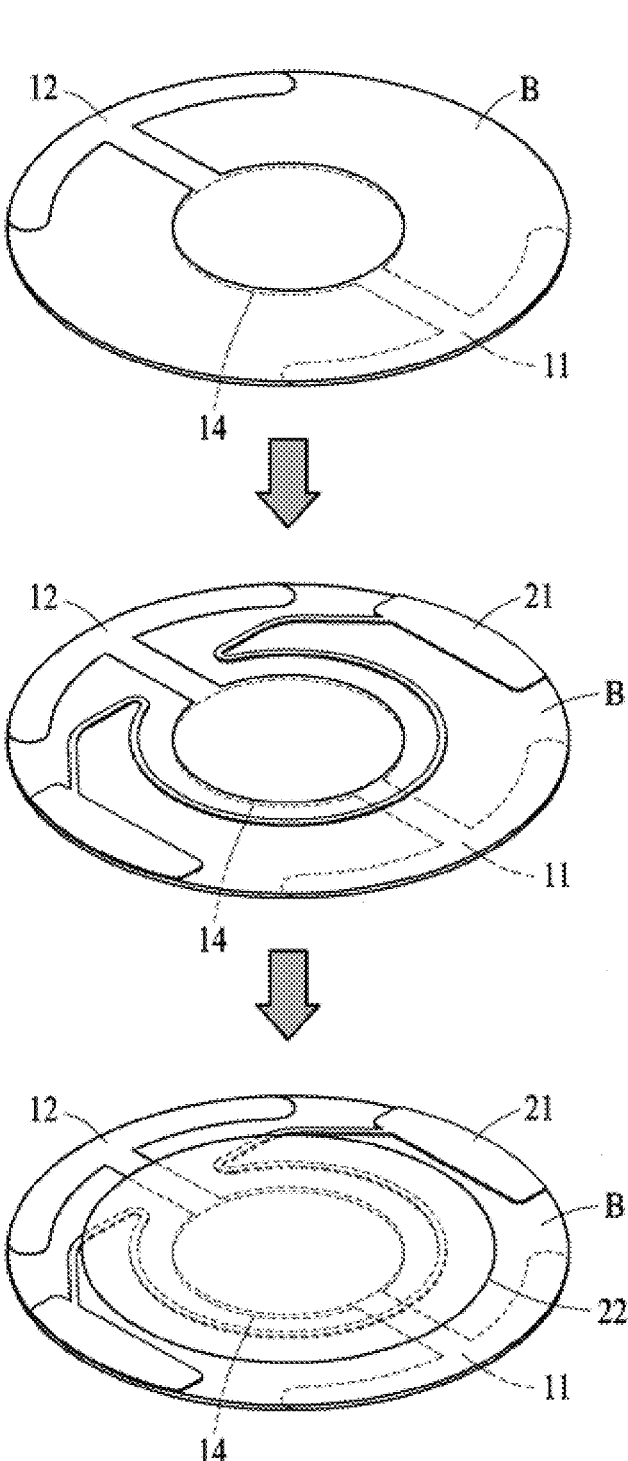
FIG. 3 schematically illustrates a method of manufacturing the particle-measuring device of FIG. 1.

Referring to FIG. 3, a method of manufacturing the particle-measuring device 1 of the present invention is described.

As shown in the upper part image of FIG. 3, first, the first and second electrodes 11 and 12 are patterned to be spaced apart from each other on the base B made of a piezoelectric material. Here, the base B is provided in a circular shape, and the first and second electrodes 11 and 12 are patterned to be spaced apart from each other in a radial direction. In addition, the adsorption electrode 15 may be patterned between the first and second electrodes 11 and 12 to correspond to the adsorption region 14. Here, the first and second electrodes 11 and 12 are electrically connected to each other across the adsorption electrode 15.

Next, the heat-generating member 21 is patterned between the first and second electrodes 11 and 12 as shown in the middle part image of FIG. 3, and the adsorption member 22 is deposited in the form of a thin film to thinly coat the surface of the patterned heat-generating member 21 as shown in the lower part image of FIG. 3. Accordingly, the particle-measuring device 1 wherein the adsorption member 22 capable of adsorbing particles is provided between the first and second electrodes 11 and 12 is finally manufactured.

In the particle-measuring device 1 described above, the adsorption member 22 made of a thermoplastic polymer material is softened as the adsorption member 22 is heated by the "on" operation of the heat-generating member 21. Accordingly, the adsorption action of the particles can be achieved in a state in which the adsorption force of the adsorption member 22 is increased, so that the physical adsorption force for measuring complex materials, such as fine dust, can be improved.

More specifically, in the particle-measuring device 1 according to this embodiment, the heat-generating member 21 is turned on in a particle capture mode to heat the adsorption member 22 made of a thermoplastic polymer material. Accordingly, a particle capture rate is increased due to excellent adsorption power due to the softening of the adsorption member 22. Next, in the particle measurement mode in which captured particles are measured after particle capture is completed, the heat-generating member 21 is turned off to harden the adsorption member 22 made of thermoplastic polymer again. Accordingly, accurate particle measurement is possible without degradation of the resonance performance of the measurement part 10 that measures the generation of vibration due to transmission and reception of alternating current signals between the first and second electrodes 11 and 12.

Figure 4A:
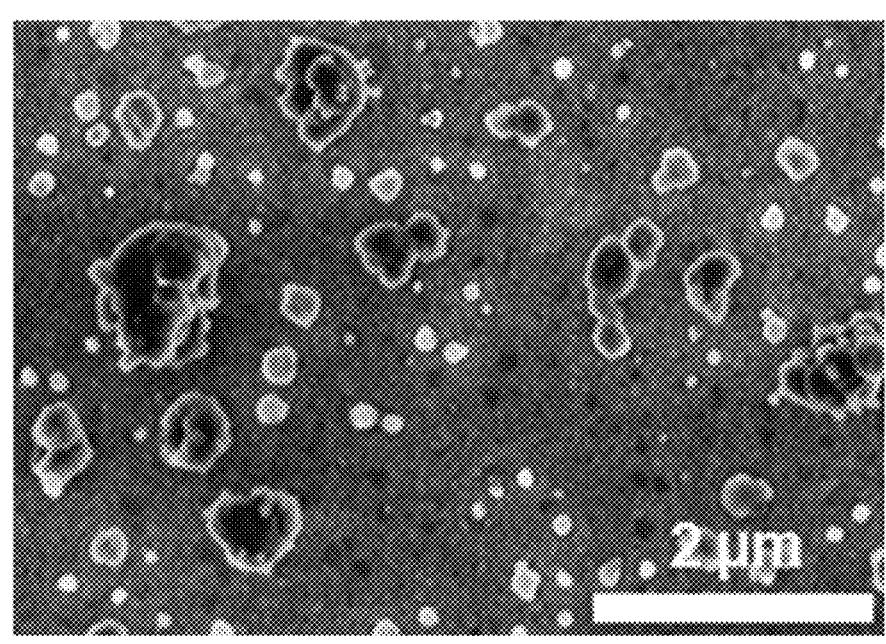
FIGS. 4A and 4B schematically illustrate images for comparing the capture rate of a related technology and the capture rate of a particle-measuring device 1 according to the present invention.
Figure 4B:
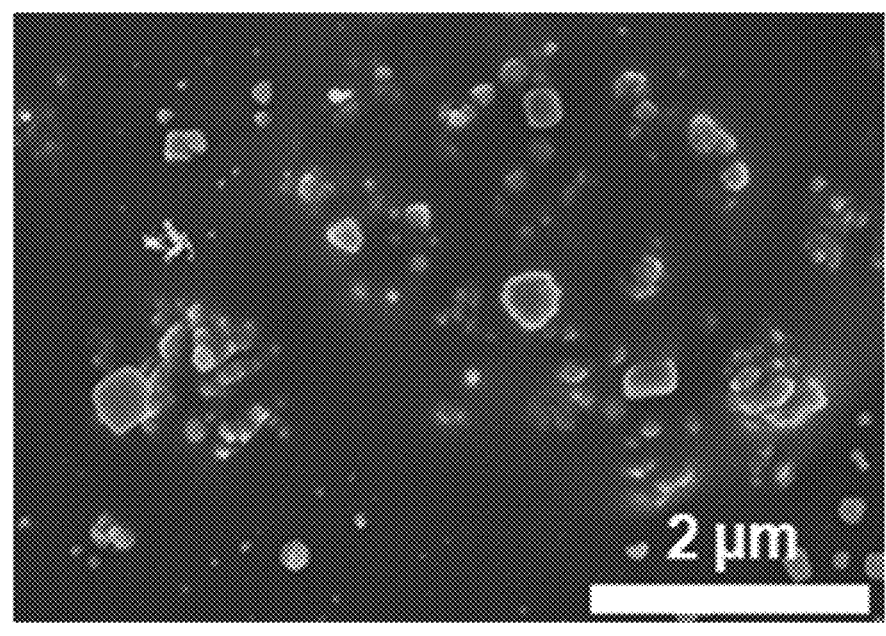

FIGS. 4A and 4B schematically illustrate images for comparing the capture rate of a related technology and the capture rate of the particle-measuring device 1 according to the present invention. FIG. 4A is a photograph of particles captured by a particle-measuring device according to a related technology in which the adsorption member 22 is not included. In addition, FIG. 4B is a photograph of particles captured by the particle-measuring device 1 according to the present invention in which the adsorption member 22 containing a thermoplastic polymer material is applied to the adsorption region 14.

From the images of FIGS. 4A and 4B, it can be confirmed that the particle-measuring device 1 according to the present invention provided with the adsorption member 22 exhibits a particle capture rate superior to the related technology. That is, it can be seen that particles penetrate into the inside of the thin film of the adsorption member 22 so that the surface adsorption force between the particle-measuring device 1 and the particles is improved.

Figure 5A:
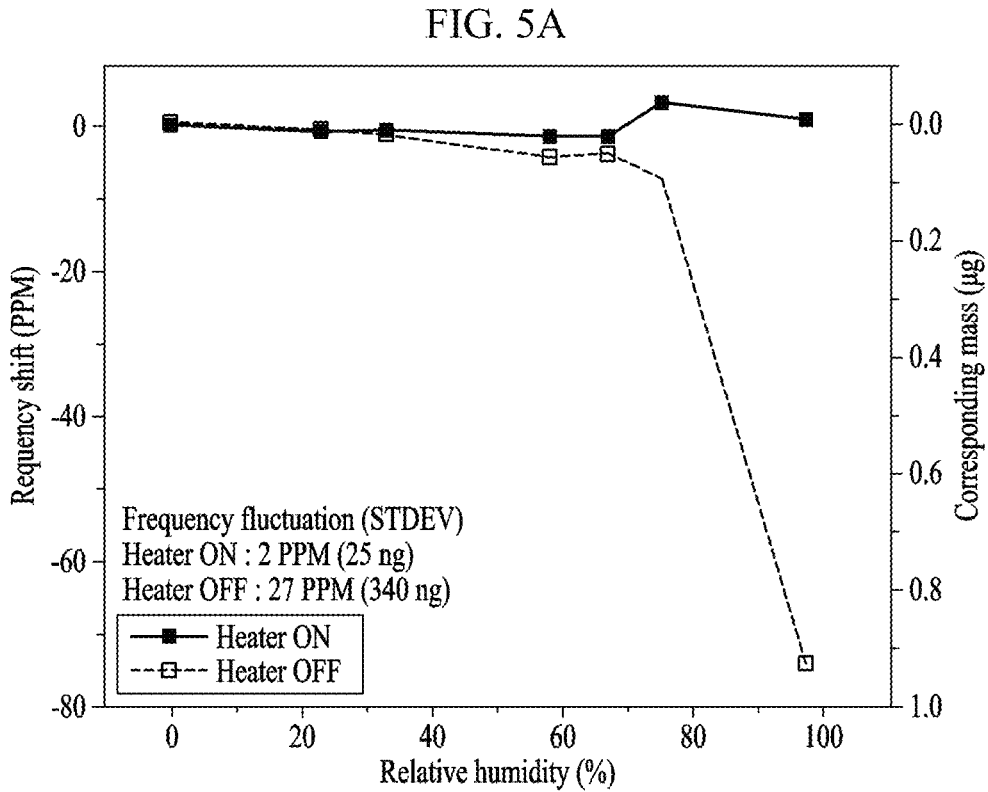
FIGS. 5A and 5B are a set of graphs illustrating mass measurement results dependent upon the presence or absence of a heat-generating member in a humidity environment.
Figure 5B:
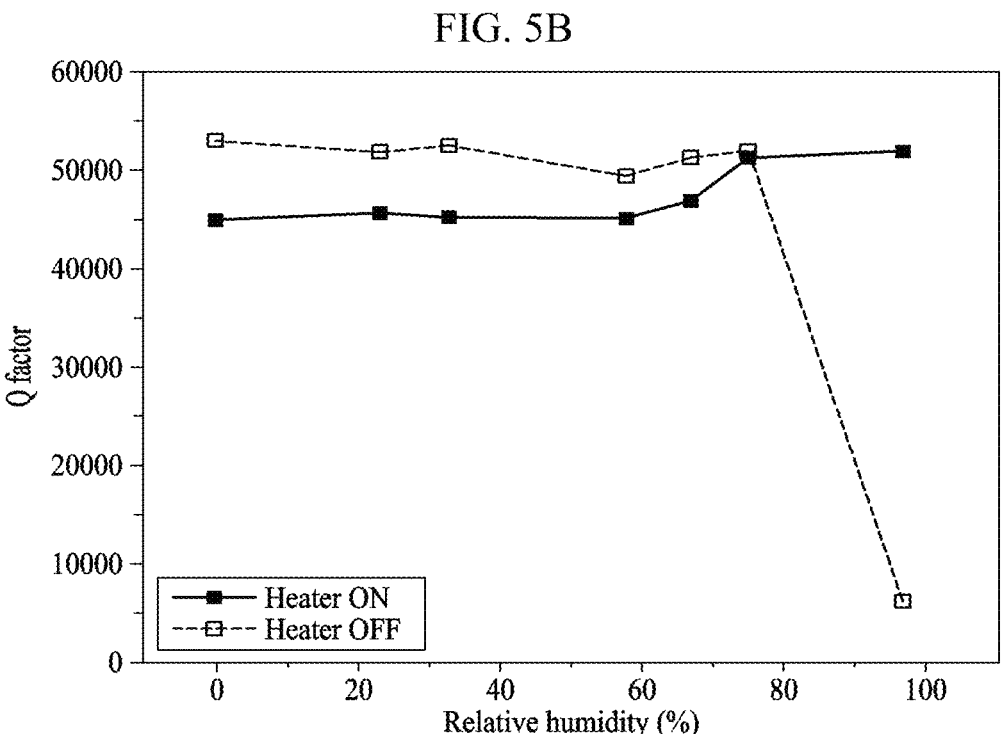

Meanwhile, since fine particles have high reactivity with moisture, the vibration characteristics of the particle-measuring device 1 may be deteriorated due to moisture condensation in a high-humidity area. However, since the present invention includes the heat-generating member 21 for heating the adsorption member 22, the moisture condensation of the particle-measuring device 1 may also be improved due to heat generated by the heat-generating member 21. Accordingly, as shown in the graphs of FIGS. 5A and 5B, the particle-measuring device 1 can exhibit stable driving characteristics even in a high-humidity environment. That is, it is possible to implement a stable system of the particle-measuring device 1 which is not affected by external environmental factors by improving the existing problems dependent on temperature and humidity.

For reference, it can be confirmed from FIGS. 5A and 5B that the vibration frequency shift becomes uniform by turning on the heat-generating member 21 that is a heater, so that the accuracy of the measured particle mass measurement rate can be maintained.

While the present invention has been described referring to the preferred embodiments, those skilled in the art will appreciate that many modifications and changes can be made to the present invention without departing from the spirit and essential characteristics of the present invention.

The invention claimed is:

1. A particle-measuring device comprising:
a measurement part comprising a first electrode and a second electrode patterned on a base made of a piezoelectric material and a control circuit electrically connected to the first electrode and the second electrode; and
an adsorption part provided in an adsorption region between the first electrode and the second electrode and configured to adsorb particles according to a temperature change,
wherein the control circuit applies an alternating-current (AC) excitation to the first electrode, and detects, at the second electrode, a vibration-induced electrical response communicated through the base across an inter-electrode region including the adsorption part, and
wherein the control circuit measures a mass of particles adsorbed on the adsorption part by comparing a change in the detected electrical response with the applied AC excitation.

2. The particle-measuring device according to claim 1, wherein
the first electrode and the second electrode are patterned to be spaced apart from each other with respect to the base to face each other.

3. The particle-measuring device according to claim 1, wherein the adsorption part further comprises:
a heat-generating member patterned in the adsorption region between the first electrode and the second electrode; and
an adsorption member deposited to cover the heat-generating member,
wherein in a particle capturing mode for capturing the particles, heating of the heat-generating member is turned on to soften the adsorption member and capture the particles, and in a particle measurement mode for measuring the particles, heating of the heat-generating member is turned off to harden the adsorption member.

4. The particle-measuring device according to claim 3, wherein the adsorption member is made of a thermoplastic polymer material and coated on a surface of the base in a film form to cover the heat-generating member.

5. The particle-measuring device according to claim 3, wherein the heat-generating member is made of a metal material comprising platinum, and the adsorption member is made of a thermoplastic polymer plastic material comprising poly(methyl methacrylate) (PMMA).

6. The particle-measuring device according to claim 1, wherein the base resonates along a thickness or surface and has a circular or square shape.

7. The particle-measuring device according to claim 1, wherein an adsorption electrode is provided between the first electrode and the second electrode to be electrically connected to the first electrode and the second electrode to correspond to the adsorption region.

8. A method of manufacturing a particle-measuring device, the method comprising:
a first step of patterning a first electrode and a second electrode to be spaced apart from each other on a base made of a piezoelectric material;
a second step of patterning a heat-generating member capable of generating heat, between the first electrode and the second electrode; and
a third step of depositing an adsorption member on a surface of the heat-generating member,
wherein when the heat-generating member is turned on, particles are captured on the adsorption member, and, when the heat-generating member is turned off, the piezoelectric material resonates to measure the particles.

9. The method according to claim 8, wherein the adsorption member is made of a thermoplastic polymer material and coated on a surface of the base in a film form to cover the heat-generating member.

10. The method according to claim 8, wherein the heat-generating member is made of a metal material comprising platinum, and the adsorption member is made of a thermoplastic polymer plastic material comprising poly(methyl methacrylate) (PMMA).

11. The method according to claim 8, wherein the base resonates along a thickness or surface and has a circular or square shape.

12. The method according to claim 8, wherein an adsorption electrode is provided between the first electrode and the second electrode to be electrically connected to the first electrode and the second electrode to correspond to a adsorption region.

* * * * *